Figure 1:
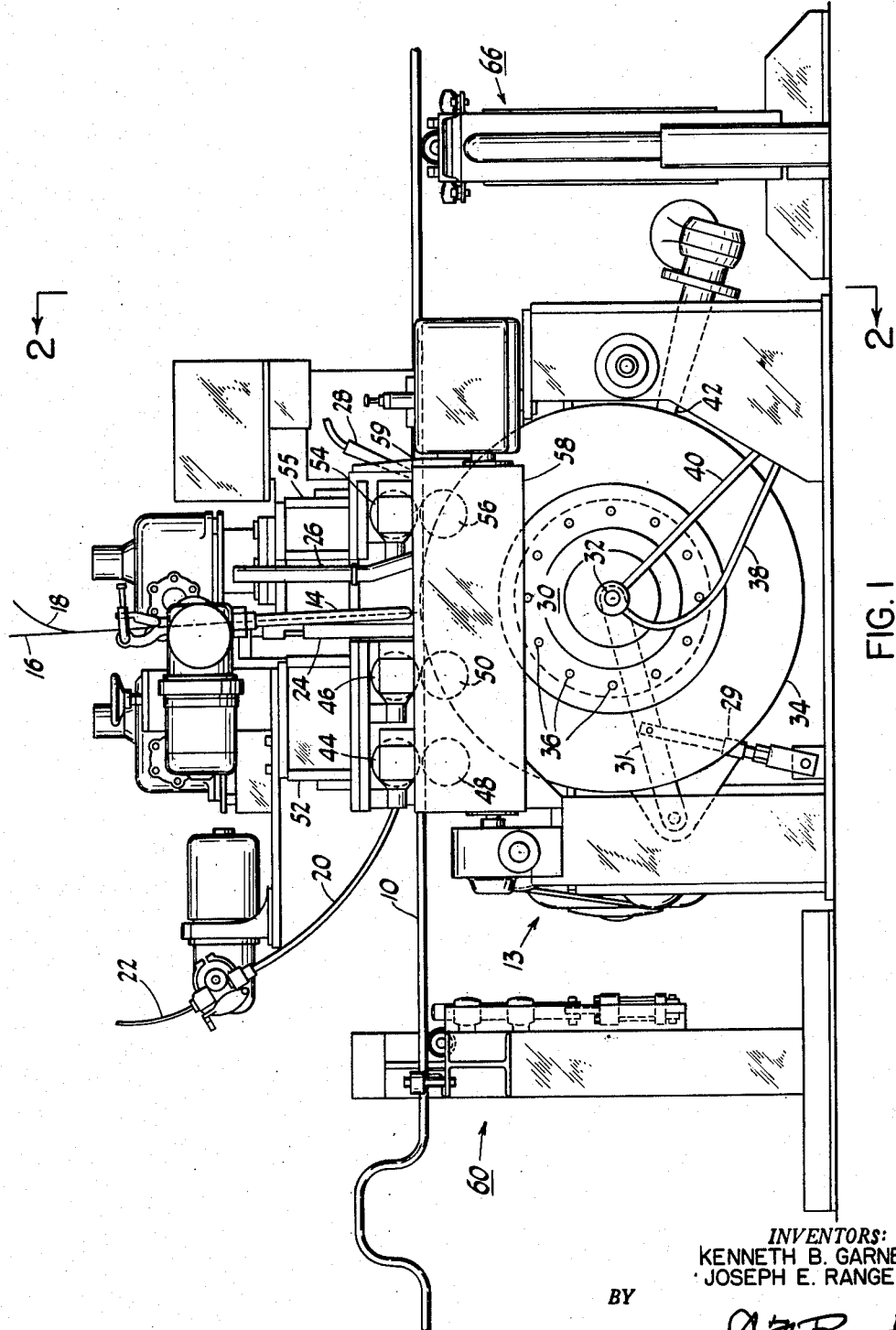

March 31, 1964   K. B. GARNER ETAL   3,127,503
MOVING-TUBE SOLID PANEL WELDER
Filed Sept. 6, 1961   4 Sheets-Sheet 1

INVENTORS:
KENNETH B. GARNER
JOSEPH E. RANGER
BY
ATTORNEY

March 31, 1964  K. B. GARNER ETAL  3,127,503
MOVING-TUBE SOLID PANEL WELDER
Filed Sept. 6, 1961  4 Sheets-Sheet 2

INVENTORS:
KENNETH B. GARNER
JOSEPH E. RANGER

BY

ATTORNEY

March 31, 1964 K. B. GARNER ETAL 3,127,503
MOVING-TUBE SOLID PANEL WELDER
Filed Sept. 6, 1961 4 Sheets-Sheet 3

INVENTORS:
KENNETH B. GARNER
JOSEPH E. RANGER
BY
Q. T. Bryant
ATTORNEY

March 31, 1964  K. B. GARNER ETAL  3,127,503
MOVING-TUBE SOLID PANEL WELDER

Filed Sept. 6, 1961  4 Sheets-Sheet 4

INVENTORS:
KENNETH B. GARNER
JOSEPH E. RANGER
BY
ATTORNEY

# United States Patent Office 3,127,503
Patented Mar. 31, 1964

3,127,503
MOVING-TUBE SOLID PANEL WELDER
Kenneth B. Garner and Joseph E. Ranger, Chattanooga, Tenn., assignors to Combustion Engineering, Inc., Windsor, Conn., a corporation of Delaware
Filed Sept. 6, 1961, Ser. No. 136,283
12 Claims. (Cl. 219—124)

This invention relates to welding apparatus and its method of operation for welding together parallel members, in particular metallic tube, so as to form panels thereof.

In the boiler industry in recent years, it is becoming more and more common to line the walls of the furnace with tubes which are connected together with a web of weld metal, which is approximately one half inch wide and one quarter inch thick, so that the adjacent tubes so connected are spaced approximately one half inch apart.

The present method being used today for forming these panels, or walls of tubes, is to place two tubes to be connected by web weld on either side of a chilling or backing strip made of copper, which is so formed as to space the tubes the required distance apart, and also acts to form a dam near or above the center-lines of the two tubes which supports the weld metal during solidification. These copper bars which act as backing strips extend the full length of a long table, and the tubes are clamped into alignment with a large number of hydraulic clamps. A filler bar is then laid between the two tubes and upon the surface of the copper bar. A conventional submerged arc welding machine then moves the length of the table, fusing the filler bar, and casting a web of weld metal between the adjacent tubes. Pairs of tubes so welded are again placed on either side of the copper bar and by an identical process another web is cast, thus connecting the pairs together to make panels of four. This process can be repeated to obtain as large a panel as desired. This process is described in more detail in the Chapman Patent No. 2,719,210 which issued on September 27, 1955.

The above-described process has disadvantages, in that the long length of the table and the track for the welding apparatus, plus the large number of hydraulic clamps required, are expensive. Some of the tubes used in forming panels are in excess of 60 feet in length. Tube handling onto and off the table is awkward and time consuming, as is aligning and clamping the tubes. Also, the expense of replacing the long copper chill bar is considerable, as is the shut down time in making such a replacement. Another disadvantage is the problem of welding tubes together which contain bends or offset portions therein.

Most of the above disadvantages are overcome by our new and novel tube panel welder and its method of operation.

It is an object of our invention to provide a stationary welding apparatus and its method of operation, whereby the tubes to be welded together are moved past it.

It is a further object of this invention to provide a back up wheel, the outer rim of which will act as the backing strip for the molten metal as it solidifies.

It is another object to provide means for cleaning and dressing the outer rim of the backing wheel, so as to maintain a clean surface to be used as the backing strip.

It is still another object to provide guide and drive means for moving the tubes to be welded together past the welding head.

A still further object is to permit tubes containing offset portions or bends therein to pass through the welding apparatus.

Figure 2:
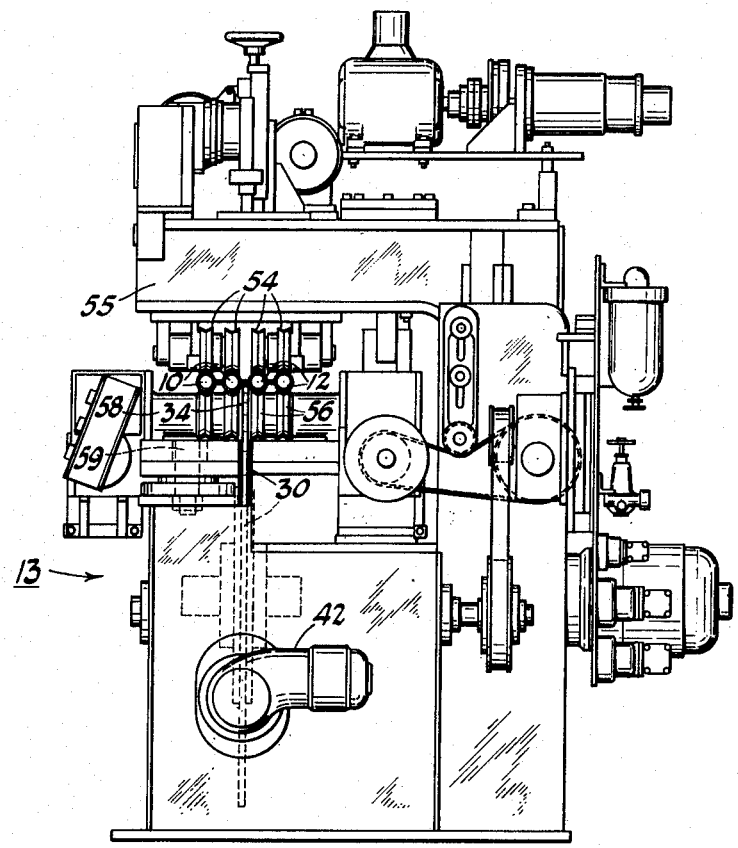
Figure 6:
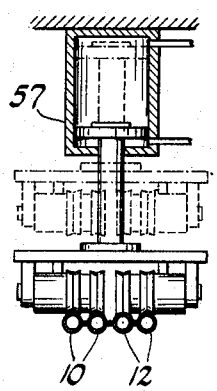
Figure 3:
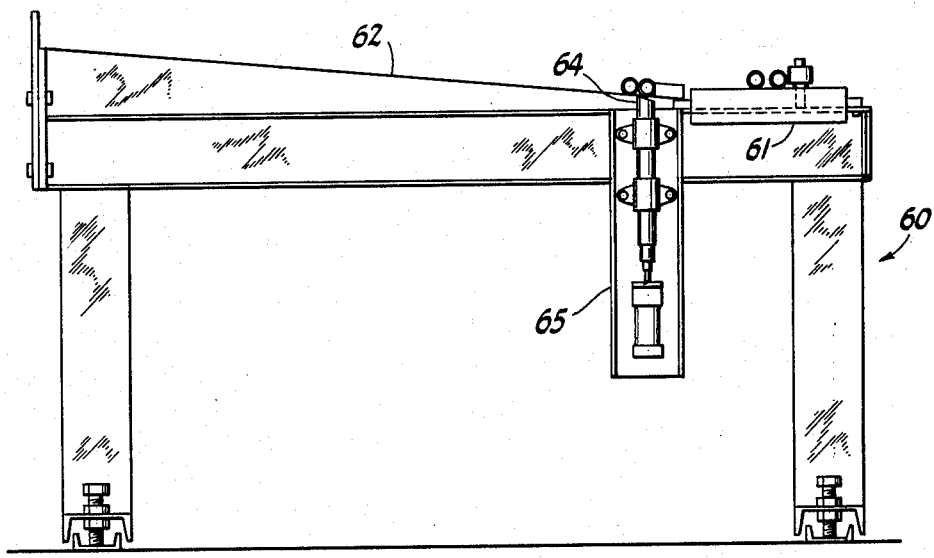
Figure 4:
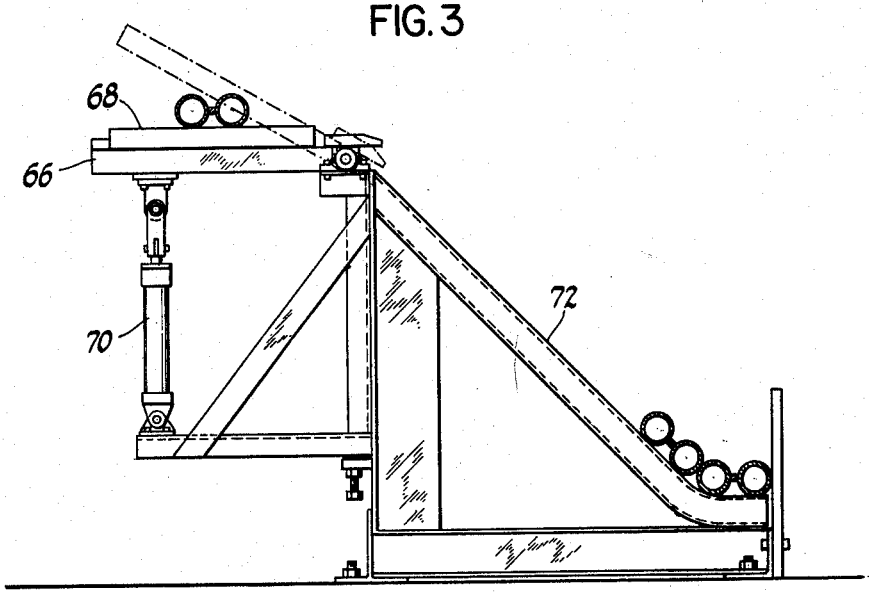
Figure 5:
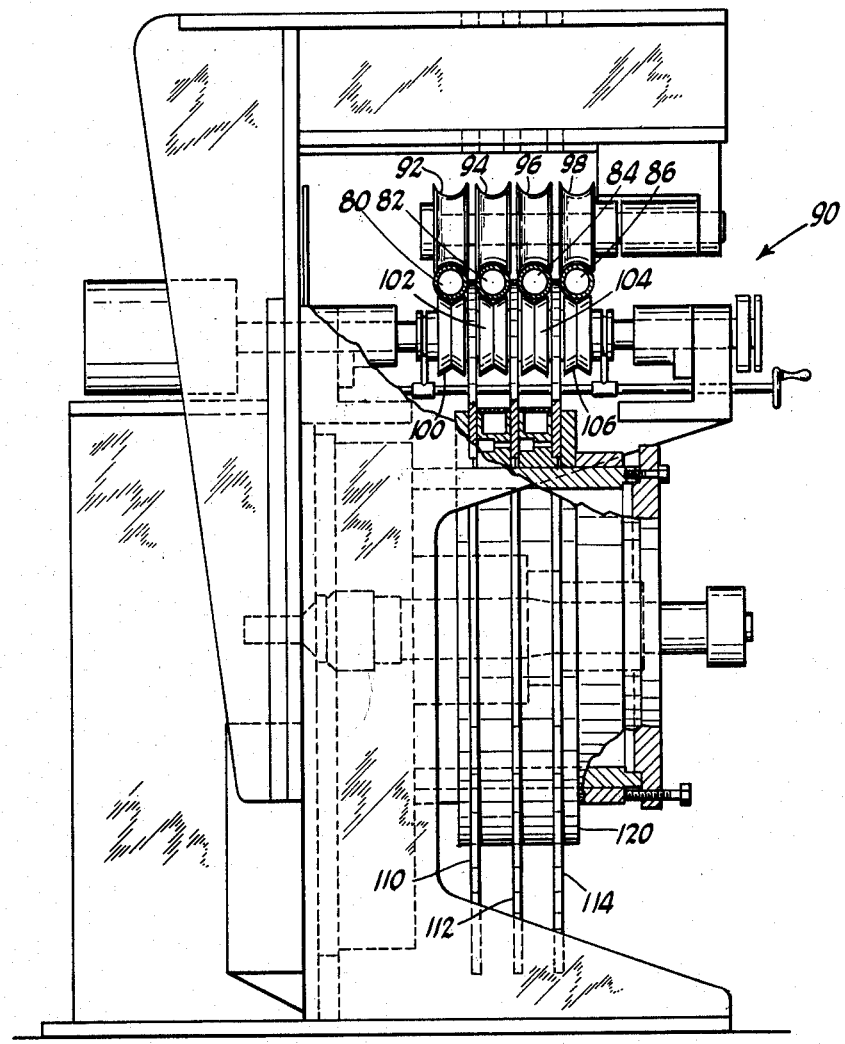

Other objects and advantages will become apparent from the following description of the illustrative embodiment of this invention when considered with the accompanying drawings, wherein:

FIGURE 1 is a front view of a tube welder;
FIGURE 2 is a side view of the tube welder taken along line 2—2 of FIGURE 1;
FIGURE 3 is a view of one of the feed-in racks used in conjunction with the tube welder;
FIGURE 4 is a view of one of the feed-out racks used in conjunction with the tube welder;
FIGURE 5 is a side view showing a different embodiment of a tube welder whereby more than two tubes may be simultaneously welded together;
FIGURE 6 shows an air cylinder arrangement by which the upper rollers of FIGURE 1 can be moved in an upward and downward direction.

Looking now to the drawings, 13 designates the welding machine in its entirety. Numerals 10 and 12 indicate the two parallel, spaced steel tubes to be welded together. The two tubes are fed into the welding machine by means of pairs of entrance drive rollers 48 and 50, which can be suitably gear or chain driven by means of a motor (not shown). The two tubes are held in engagement with the drive rollers by means of pairs of upper entrance guide rollers 44 and 46. These rolls also determine the final tube spacing and alignment.

In forming panels of welded tubes for use as walls of a boiler, it is necessary to provide offset portions or bends in some of the tubes so that openings within the walls or panels are formed. The purposes of such offsets are to provide inspection openings, soot blower openings, etc. in the boiler walls. In order to permit such offset portions to pass through the upper and lower roller means, the upper rolls 44 and 46 are mounted and supported on a frame 52 which is movable upwardly by suitable means, such as an air cylinder 57 shown in FIGURE 6. This frame can be so constructed such that it will permit offsets approximately 16 inches high to pass therebeneath when it is in the raised position.

The filler wire 22, which will form the web between the two tubes, is fed into the machine by means of filler wire guide 20. This filler wire 22 partially fills the space between the two tubes to be welded together. Two electrode wires 16 and 18 are positioned above the filler wire by means of electrode wire guide 14. The electrode wires, the filler wire and the tubes are electrically connected such that an arc is established between the consumable electrode wires 16 and 18, and the filler wire. It should be pointed out that bars of metals could be used in place of filler wire for forming the web between the tubes if desired. The source of current can be either A.C. or D.C. as desired. In order to protectively shield the weld to prevent oxidation thereof, a flux dispensing means 24 deposits flux material on the weld area. Suitable flux recovery means 26 picks up the excess flux. The filler and electrode wire guides, and the flux recovery and dispensing means are also mounted on frame 52, so as to be movable therewith. Air chisel 28 clears or removes the slag from the weld.

A back up wheel is positioned beneath the welding head, and the upper portion of the rim thereof extends between the two parallel tubes, and substantially fills this space. The back up wheel 30 contains an outer rim portion 34 made of copper, which acts as a backing strip, or chilling strip for the molten metal as it solidifies. This copper outer rim portion 34 is removably secured to the basic wheel 30 by means of bolts 36. The basic wheel 30 is cooled by water which passes through passages within the wheel, and flows to and from such wheel by means of inlet and outlet hoses 38 and 40.

As the outer surface of the copper rim portion 34 becomes burned, or picks up slag, it can be cleaned by means of an end mill 42. This end mill is mounted on means such that it can be moved toward and away from wheel 30, and when periodically moved into contact with the surface of the outer rim, a thin layer of copper is removed therefrom. This maintains a clean surface for use as the backing strip or chilling strip. The axle 32 for wheel 30 is mounted on a pivoted means, 31, so that it can be moved upwardly by adjusting means 29 as the diameter of the wheel is reduced by means of the end mill or cutter 42, so that the upper rim remains positioned between and substantially fills the space between the tubes. By this same adjusting means, the copper wheel can be adjusted to form the weld on the center of the tubes, above the center, or below the center, as desired.

A pair of exit drive rollers 56 are positioned on the outlet side of the welding head. Upper rollers 54 press the tubes into engagement with the lower drive rolls 56, and these rollers are mounted on a frame 55 which is movable upwardly by suitable means such as an air cylinder in the same manner as the upper entrance drive rolls described earlier and shown in FIGURE 6. The air chisel 28 can also be mounted on this frame 55.

The linear speed of the outer periphery of the drive rolls 48, 50, and 56, should all be the same. This can be accomplished by driving these rollers from the same motor, or by means of synchronized motors. Some suitable means should be provided for varying the r.p.m. of the copper wheel, so that a linear speed comparable to that at which the tubes are moving is maintained by the outer rim as the diameter thereof is reduced.

Looking now to FIGURES 3 and 4, the structure of the feed in and feed out racks is illustrated. FIGURE 3 illustrates a feed in rack 60, a plurality of which supports the tubes which are to be welded together at the entrance end of the welding machine 13. Roller assembly 61 is mounted on each rack 60. An inclined table 62 is provided adjacent the feed in racks 60, and this table can store a number of tubes which are to be welded together. Tubes can be moved from the inclined table 62 onto the roller assembly 61 by means of an air cylinder operated member 64. In this manner a single operator for the welding machine is all that is necessary, since all of the work can be automatically controlled from a single control board.

Illustrated in FIGURE 4 is a feed out rack 66, a plurality of which supports the welded tubes as they leave the welding machine. Rack 66 contains a roller assembly 68, which can be tilted by an air cylinder 70, so that pairs of welded tubes can be dispensed onto a storage rack 72. From here the welded tubes can be removed as needed.

The operation of the welding machine will now be described. Tubes to be welded together are driven into the welding machine 13 and are suitably positioned and aligned by means of rollers 44, 46, 48 and 50. Filler wire 22 is fed into the machine in the space between the two tubes by means of filler wire guide 20. A welding arc is struck between electrodes 16 and 18 and the filler wire to melt and fuse such wire into a web joining the two tubes 10 and 12. The outer rim portion 34 of back up wheel 30 acts as a backing or chilling strip for the molten metal as it solidifies. The current being supplied to the electrodes, and the speed of movement of the tubes through the welding machine should be so adjusted that the filler wire 22 is completely melted, without fusing the outer rim surface of the copper back up wheel 30 thereto. Occasional burning of the outer rim portion of the wheel 30 may take place, and slag will be formed thereon, and it is for this purpose that the end mill 42 is provided. The drive rolls 48, 50, and 56, are mounted on a hinged box portion 58 which is swingable outwardly about hinge 59 to permit the outer rim portion 34 to be replaced when it reaches a predetermined minimum diameter.

All of the rollers are removably secured, so that more can be added when pairs of tubes are being welded to pairs, or panels of four are being welded together. FIGURE 2 shows an additional set of rollers, which can be utilized to weld pairs of tubes to other pairs. Also, different sizes of tubes may be welded together by using different size rollers and different sized filler wire or metal bars. The upper rollers 44, 46, and 54 should be spring mounted to their respective frames to allow for slight give or play in the rollers.

FIGURE 5 shows a welding machine capable of casting two or more webs simultaneously, to weld three or more tubes together at the same time. This is done by using a multiplicity of drive rolls, back up wheels, welding heads, etc. The three or more tubes are driven through the welding machine simultaneously, and a web is cast between each parallel, adjacent pair of tubes by a plurality of welding heads, which webs are backed up by a plurality of copper back up wheels.

Looking now to FIGURE 5, four tubes 80, 82, 84, and 86 are driven through welding machine 90 by means of upper and lower guide and drive rolls 92, 94, 96, 98, 100, 102, 104, and 106, and a suitable welding head (not shown) deposits three webs of molten metal, one between each adjacent pair of tubes. These molten webs of metal are supported by the three copper back up wheels 110, 112, and 114, all of which are removably secured to the inner wheel or rim 120. An end mill or cutter such as 42 of FIGURE 1, is provided for each copper wheel 110, 112, and 114, and all three are mounted on the same movable means so that they are simultaneously moved toward and away from the wheels, thus maintaining the diameter of the wheels the same.

Although the apparatus and its method of operation has been described in connection with the formation of water wall panels which are composed of integrally welded thin walled tubes which are used in modern high capacity steam generators, it is to be understood that the welding machine has utility in refinements other than that herein employed to illustrate and explain the same. We therefore do not wish to be limited in the scope of our invention except as may be required by the claims. For example, metal members other than tubes could be welded together, so long as they have edges that can be positioned parallel to each other.

What we claim is:

1. Apparatus for welding together two parallel, spaced metallic members continuously along their adjacent longitudinal portions comprising, a wheel, said wheel having its outer rim made of copper, said wheel being positioned such that the two members to be welded together pass by adjacent to the upper portion of the rim of said wheel, one member being adjacent one side of the wheel, and the second member being adjacent the other side of said wheel, means for depositing molten metal between said parallel members above said wheel, said molten metal, when solidified, forming a weld connection between said parallel members, the outer rim of said wheel acting as a backing strip for said molten metal, and means for moving said parallel members longitudinally past said wheel and for rotating said wheel as said members move past it.

2. Apparatus for welding together two parallel, spaced ferrous tubes continuously along their adjacent longitudinal portions comprising, a wheel having its outer rim made of copper, said wheel being positioned such that the two tubes to be welded together pass by adjacent to the upper portion of the rim of said wheel, one tube being adjacent one side of the wheel, and the second tube being adjacent the other side of said wheel, means for depositing a molten ferrous metal between said parallel tubes above said wheel, said molten ferrous metal, when solidified, forming a weld between said parallel tubes, the outer rim of said wheel being directly in contact with said molten ferrous metal and acting as a backing strip therefor, and means for guiding and driving said parallel tubes longitudinally past said wheel, and also for rotating said wheel as said tubes move past it.

3. Apparatus for welding together two parallel, spaced ferrous tubes continuously along their adjacent longitudinal portions, comprising, a wheel having an outer rim portion made of copper, said wheel being positioned such that the two tubes to be welded together pass by adjacent to the upper portion of the rim of said wheel, one tube being adjacent one side of the wheel, and the second tube being adjacent the other side of said wheel, means for depositing a molten ferrous metal between said parallel tubes above said wheel, said molten ferrous metal, when solidified, forming a weld between said parallel tubes, the outer rim of said wheel being directly in contact with said molten ferrous metal and acting as a backing strip therefor, roller means for guiding and driving said parallel tubes longitudinally past said wheel, and means for rotating said wheel as said tubes move past it.

4. The apparatus set forth in claim 3, whereby said roller means includes rollers mounted on a movable frame, such that said rollers may be moved away from said tubes to permit offset or bent portions of the tubes to pass by said roller means.

5. Apparatus for welding together two parallel, spaced metallic tubes continuously along their adjacent longitudinal portions, comprising, a wheel having its outer rim made of a material which will not become fused when directly exposed to a molten metal for a limited period of time, said wheel being positioned such that the two tubes to be welded together pass by adjacent to the upper portion of the rim of said wheel, one tube being adjacent one side of the wheel, and the second tube being adjacent the other side of said wheel, means for depositing a molten metal between and completely spanning the space between said parallel tubes above said wheel, said molten metal, when solidified, forming a weld between said parallel tubes, the outer rim of said wheel acting as a backing strip for said molten metal, and means for moving said parallel tubes longitudinally past said wheel and for rotating said wheel as said tubes move past it.

6. Apparatus for welding together two parallel, spaced ferrous tubes continuously along their adjacent longitudinal portions, comprising, a wheel having an outer rim made of copper, said wheel being positioned such that the two tubes to be welded together pass by adjacent to the upper portion of the rim of said wheel, one tube being adjacent one side of the wheel, and the second tube being adjacent the other side of said wheel, electric arc welding means for depositing a molten ferrous metal between and completely spanning the space between said parallel tubes above said wheel, said molten ferrous metal, when solidified, forming a weld between said parallel tubes, the outer rim of said wheel being directly in contact with said molten ferrous metal and acting as a backing strip therefor, roller means positioned above and below each of the two tubes for guiding and driving said tubes longitudinally past said wheel, and means for rotating said wheel as said tubes move past it.

7. The apparatus set forth in claim 6, the roller means positioned above each of the two tubes being mounted on a frame movable upwardly, such that offset or bent portions in the tubes can pass between said roller means.

8. The apparatus set forth in claim 7, including means to support the tubes moving toward said wheel and away from said wheel.

9. The apparatus set forth in claim 8, including means for positioning tubes to be welded together on said support means, and for removing the welded tubes therefrom.

10. Apparatus for welding together two parallel, metallic members continuously along their adjacent longitudinal portions comprising, a rotatable member, said rotatable member being positioned such that the adjacent longitudinal portions of the two parallel, metallic members pass by and are in contact with the upper portion of said rotatable member, means for forming molten metal between said parallel members above said rotatable member, said molten metal, when solidified, joining said parallel members, and means for moving said parallel members longitudinally past said rotatable member.

11. Apparatus for welding together two parallel, metallic members continuously along their adjacent longitudinal portions comprising, a wheel, said wheel being positioned such that the adjacent longitudinal portions of the two parallel, metallic members pass by and are in contact with the upper portion of said wheel, means for forming molten metal between said parallel members above said wheel, said molten metal, when solidified, joining said parallel members, and means for moving said parallel members longitudinally past said wheel.

12. Apparatus for welding together two parallel, spaced metallic members continuously along their adjacent longitudinal portions comprising, a wheel, said wheel being positioned such that the two members to be welded together pass by adjacent to the upper portion of the rim of said wheel, one member being adjacent one side of said wheel, and the second member being adjacent the other side of said wheel, means for forming molten metal between said parallel members above said wheel, said molten metal, when solidified, joining said parallel members, the outer rim of said wheel acting as a backing strip for said molten metal, and means for moving said parallel members longitudinally past said wheel and for causing rotation of said wheel as said parallel members move past it.

References Cited in the file of this patent
UNITED STATES PATENTS

| | | |
|---|---|---|
| 1,806,949 | Palm | May 26, 1931 |
| 1,806,954 | Schmitz | May 26, 1931 |
| 1,862,296 | Burnish | June 7, 1932 |
| 2,467,027 | Glandis | Apr. 12, 1949 |